US008244473B2

(12) United States Patent
Radtke et al.

(10) Patent No.: US 8,244,473 B2
(45) Date of Patent: Aug. 14, 2012

(54) SYSTEM AND METHOD FOR AUTOMATED DATA ANALYSIS AND PARAMETER SELECTION

(75) Inventors: Richard J. Radtke, Pearland, TX (US); Robert Perchonok, Houston, TX (US); Matthew McCoy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 431 days.

(21) Appl. No.: 11/830,596

(22) Filed: Jul. 30, 2007

(65) Prior Publication Data

US 2009/0037111 A1    Feb. 5, 2009

(51) Int. Cl.
*G01V 1/40* (2006.01)

(52) U.S. Cl. .............. 702/11; 73/152.02; 73/152.18; 73/152.55

(58) Field of Classification Search ............ 702/6–13, 702/50, 52–55, 85, 100; 73/152.01–152.19, 73/152.43, 152.45, 152.55; 324/323, 324, 324/333; 367/86; 175/50
See application file for complete search history.

(56) References Cited

U.S. PATENT DOCUMENTS

| | | | |
|---|---|---|---|
| 3,590,228 A | | 6/1971 | Burke |
| 3,600,582 A | * | 8/1971 | Davis et al. ............ 376/167 |
| 3,638,484 A | | 2/1972 | Tixier |
| 3,721,960 A | * | 3/1973 | Tinch et al. ............ 73/152.02 |
| 4,210,966 A | * | 7/1980 | Ingram ............ 367/27 |
| 4,245,313 A | | 1/1981 | Coates |
| 4,320,224 A | | 3/1982 | Rose et al. |
| 4,403,290 A | | 9/1983 | Clavier et al. |
| 4,492,865 A | * | 1/1985 | Murphy et al. ............ 250/265 |
| 4,873,488 A | | 10/1989 | Barber et al. |
| 4,949,045 A | | 8/1990 | Clark et al. |
| 5,699,246 A | | 12/1997 | Plasek et al. |
| 5,944,124 A | | 8/1999 | Pomerleau et al. |
| 5,988,300 A | | 11/1999 | Pomerleau et al. |
| 6,084,052 A | | 7/2000 | Aufdermarsh et al. |
| 6,300,762 B1 | | 10/2001 | Thomas, Jr. et al. |
| 6,571,619 B2 | | 6/2003 | Herron et al. |
| 6,577,244 B1 | | 6/2003 | Clark et al. |
| 6,648,083 B2 | | 11/2003 | Evans et al. |
| 6,710,600 B1 | | 3/2004 | Kopecki et al. |
| 6,725,162 B2 | | 4/2004 | Edwards et al. |
| 6,885,942 B2 | | 4/2005 | Shray et al. |
| 7,023,212 B2 | | 4/2006 | Chen et al. |
| 7,026,813 B2 | | 4/2006 | Homan et al. |
| 7,042,225 B2 | | 5/2006 | Barber |
| 2005/0063251 A1 | | 3/2005 | Guidry et al. |
| 2005/0150655 A1 | | 7/2005 | Duong et al. |
| 2005/0150713 A1 | | 7/2005 | Garcia-Osuna et al. |
| 2005/0152219 A1 | | 7/2005 | Garcia-Osuna et al. |
| 2005/0279532 A1 | | 12/2005 | Ballantyne et al. |
| 2006/0106541 A1 | | 5/2006 | Hassan et al. |
| 2006/0192095 A1 | | 8/2006 | Stoller et al. |
| 2007/0107896 A1 | | 5/2007 | Finci et al. |

* cited by examiner

FOREIGN PATENT DOCUMENTS

GB    2358561    7/2001

*Primary Examiner* — Manuel L Barbee
(74) *Attorney, Agent, or Firm* — Shaun B. Sethna; Darla P. Fonseca

(57) ABSTRACT

System and method for automatic analysis and determination of a parameter. Measurement data are obtained from one or more sensors deployed to measure a desired parameter, the data being associated to identified locations. The measured data are processed to parse out the data obtained with at least one sensor configured to provide a measurement of a selected subsurface parameter and examined to automatically output a value determined to be the most accurate value for the selected parameter from the obtained measurement data.

18 Claims, 3 Drawing Sheets

SYSTEM AND METHOD FOR AUTOMATED DATA ANALYSIS AND PARAMETER SELECTION

BACKGROUND

1. Technical Field

This invention relates generally to the field of data processing and, more particularly, to techniques for automatic analysis and determination of a desired parameter from measurement data.

2. Description of Related Art

Explanation for oil, gas, and water entails the measurement of subsurface characteristics and the evaluation of the obtained data to determine petrophysical properties of interest for the relevant formation or reservoir. A basic process of subterranean formation evaluation consists of disposing sensors within or near a formation of interest to make the measurements. In the oil and gas industry, sensors are routinely deployed subsurface to acquire the measurements. The obtained measurement data is compiled in a recording or "log."

Well logs are measurements, typically with respect to depth, of selected physical parameters of subterranean formations. The logs can consist of measurement data pertaining to a limited region (e.g., solely within the borehole) or extending deep within the formation. Well logs are typically recorded by deploying various types of instruments equipped with sensors into a borehole traversing the formation, moving the instruments along the borehole, and recording the measurements made by the sensors. The sensors can be deployed subsurface by various means of conveyance as known in the art, including deployment at the end of an armored electrical cable (e.g., wireline, slickline), mounted on tools designed to obtain the measurements while the borhole is bearing drilled (LWD/MWD), mounted on production string tools/cabling, mounted on casing, mounted on buoys/sleds for underwater use, in the form of fiber-optic sensors, etc.

The first electrical log was recorded in 1927 in a well in a small oil field in Alsace, France. The log, a single graph of the electrical resistivity of the rock formations cut by the borehole, was recorded by the "station" method. The downhole measurement instrument (sonde) was stopped at periodic intervals in the borehole, measurements were made, and the calculated resistivity was hand-plotted on a graph.

Conventional logging tools are readily combinable. In other words, the sensor-equipped sondes of several tools can be connected to form one tool and thereby make many measurements and logs on a single descent into and/or ascent from the borehole. The measurement date are correlated to depth and position by conventional tracking systems, such as a calibrated wheel system used in wireline logging.

Basic logging measurements may contain large amounts of information. Improved telemetry technology has provided a tremendous increase in the data rate that can be handled by conventional logging systems. Subsurface measurement data may be transmitted to the surface via various conventional telemetry systems, including fluid pressure modulation systems, electrical cabling electromagnetic signals, acoustic signals, wired drill pipes, ect. The measurement data may also be stored in a recording device disposed in the logging instrument or elsewhere. These data are typically recorded with respect to depth/time. A record of the subsurface sensor position with respect to time is made and correlated to the time/ measurement record to generate a conventional log of measurements with respect to subsurface location.

The processing of the obtained measurement data can be performed on at least three levels: subsurface in the tool, uphole at the well site (e.g., in a mobile logging track unit), and at a central computing center. Conventional tools are routinely designed so that the measurement data are processed downhole and the processed signal is transmitted to the surface. In many cases, however, it is desirable to bring measured raw data to the surface for recording and processing. The original data are this available for any further processing or display purposes and are permanently preserved for future use.

The raw measurement data obtained with the downhole sensors contains the parameter information needed to derive the desired subsurface property or characteristic. For example, the petrophysical parameters needed to evaluate a formation or reservoir include, among others, porosity, hydrocarbon saturation, thickness, area, permeability, reservoir geometry, formation temperature and pressure, lithology, borehole fluid types and level a etc. Unfortunately, few of these parameters can be measured directly. Instead, they must be derived or inferred from the measurement of other subsurface parameters. A large number of parameters can be measured. They include, among others, resistivity, bulk density, interval transit time, spontaneous potential, natural radioactivity, and the hydrogen content of the rock. Log interpretation is the process by which these measurable parameters are translated into the desired petrophysical parameters of porosity, hydrocarbon saturation, permeability, producibility, lithology etc.

Log interpretation techniques have progressed from the linear solutions of simple equations in the 1940s to today's mathematical inversions and neural networks. At the early stage, interpretation was a sequential process accomplished with charts and monograms, which became increasingly complicated as a wider range of measurements became available and as the effects of environmental and well conditions were recognized. Log interpretation is now open to many options and iterations.

In the late 1970s, the idea of treating log interpretation as a problem of mathematical inversion was introduced. Each measurement was associated to a response equation that could be expressed as a set of unknown formation volumes to be solved. In the 1980s, inversion methods were further developed and different and models were run simultaneously to allow for selection of the best model. Whatever method is selected, the main tasks of well log interpretation algorithms have remained the same—to translate the acquired measurements from the sensors to quantities of petrophysical interest.

Parameter selection has always been a key subject in log interpretation. Interpretation algorithms often focus on a single type of sensor and generally depend on more parameters than are measured by the sensors for which they were designed. Values for the additional parameters are input by the engineers or log analysis who run or play back the log. Due to a lack of knowledge, insufficient time at the wellsite, or other factors, incorrect input parameters can be entered into the interpretation algorithms. Log quality and interpretation can suffer as a result. Historically, input parameters used in interpretation algorithms have been determined by explicit values entered by the user, measurements provided by a specific tool, or by a user-set switch which selects between these options. An example is the borehole diameter, which can be used to correct neutron porosity logs.

The borehole diameter (also known as "borehole caliper") can be drawn from several sources. The source used to process the log is typically selected by the user from an itemized list One component of that list is the bit size. The bit size is a number that is typically entered by the user or obtained by a direct measurement of the borehole as a function of depth. A technique for automatic determination of the borehole caliper is described in U.S. Pat. No. 6,725,162. Other automated interpretation techniques have been proposed to provide estimations of downhole characteristics in an effort to improve log interpretation. U.S. Pat. No. 4,403,290 describes a log interpretation technique that evaluates the reliability of the logging computations. U.S. Pat. No. 6,571,619 describes a technique whereby measurements from multiple sensors are combined and processed to obtain petrophysical quantities. The use of artificial neutral networks has also been implemented to convert logs into desired quantities. The networks are trained on wells where results are already known, and once trained, they are applied to other wells in which the same model applies.

In practice, the quality of subsurface logging results depends on what is gleaned from the raw log measurement data. A need remains for improved techniques to minimize the problem of parameter selection.

SUMMARY

One aspect of the invention provides a method for determination of a subsurface parameter. The method includes obtaining measurement data from at least one sensor deployed subsurface to measure a parameter, the data being associated to identified subsurface locations; processing the obtained measurement data to parse out the data obtained with at least one sensor configured to provide a measurement of a selected subsurface parameter; and processing the parsed out measurement data for examination to automatically output a value determined to be an accurate value for the selected subsurface parameter from the obtained measurement data.

Another aspect of the invention provides a system for determination of a subsurface parameters. The system includes a processor to accept measurement data obtained from at least one sensor deployed subsurface to measure a parameter, the data being associated to identified subsurface locations; the processor configured with instructions to process the obtained measurement data to parse out the data obtained with at least one sensor configured to provide a measurement of a selected subsurface parameter: and the processor instructions including processing the parsed out measurement data for examination to automatically output a value determined to be an accurate value for the selected subsurface parameter from the obtained measurement data.

Another aspect of the invention provides a computer program processable by a processor. The program includes instructions to accept measurement data obtained from at least one sensor deployed subsurface to measure a parameter, the data being associated to identified subsurface locations; instructions to process the obtained measurement data to parse out the data obtained with at least one sensor configured to provide a measurement of a selected subsurface parameter; and instructions to process the parsed out measurement data associated to an identified subsurface location for examination in the order of most to least robust to automatically output the first data value of adequate accuracy for the selected subsurface parameter from the obtained measurement data.

BRIEF DESCRIPTION OF THE DRAWINGS

Other aspects and advantages of the invention will become apparent upon reading the following detailed description and upon reference to the drawings in which like elements have been given like numerals and wherein.

DETAILED DESCRIPTION

Figure 1:
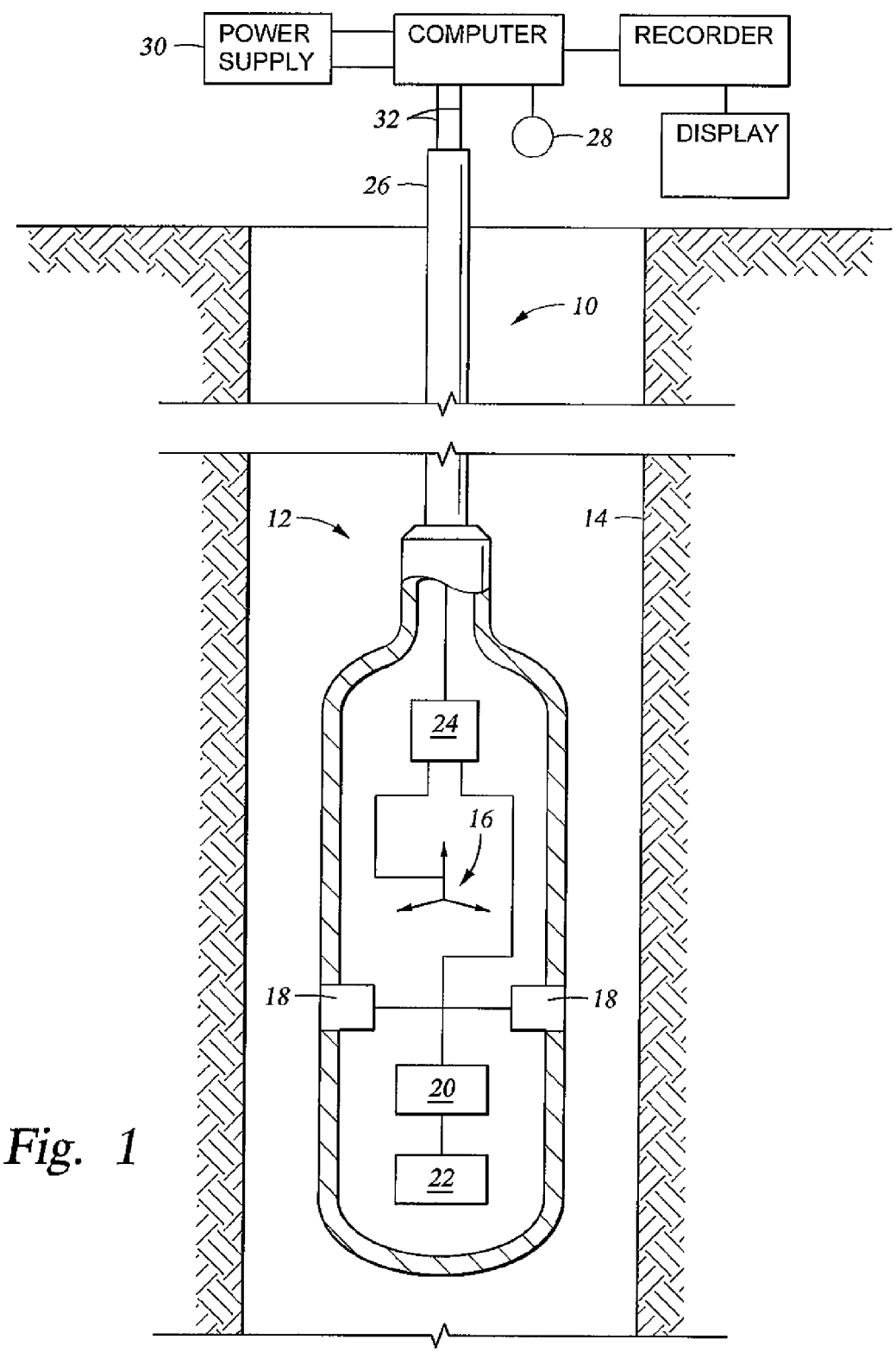
FIG. 1 shows a downhole logging system in accord with the invention.

FIG. 1 shows a logging system 10 used to acquire subsurface measurement data. The system 10 includes a downhole tool 12 shown disposed in a borehole 14 that penetrates an earth formation. The tool 12 is equipped with various sources and sensors to perform a variety of subsurface measurements as known in the art. The tool 12 includes a multi-axial electromagnetic antenna 16, an acoustic source/sensor 18 array, a neutron source/sensor array 20, and a gravity sensor 22. The tool 12 also houses electronics/hardware 24 with appropriate circuitry. The tool 12 is shown supported in the borehole 14 by a logging cable 26 in the case of a wireline system or a drill string 26 in the case of a while-drilling system. With a wireline tool, the tool 12 is raised and lowered in the borehole 14 by a winch 28, which is controlled by the surface equipment 30. Logging cable or drill string 26 includes conductors 32 that connect the downhole electronics 24 with the surface equipment 30 for signal/data and control communication. Alternatively, the signals/data may be processed or recorded in the tool 12 and the processed data transmitted to the surface equipment 30. The illustrated logging system 10 is one example of how sensors are deployed subsurface to obtain desired measurement data. Other methods may include underwater sensor deployment, the firing of "bullet type" sensors into a formation, fiber-optic sensors, sensors mounted on casing, and other means known in the art. The precise forms of source-sensor measurement generations vary according to the desired measurements and applications as known in the art.

Figure 2:
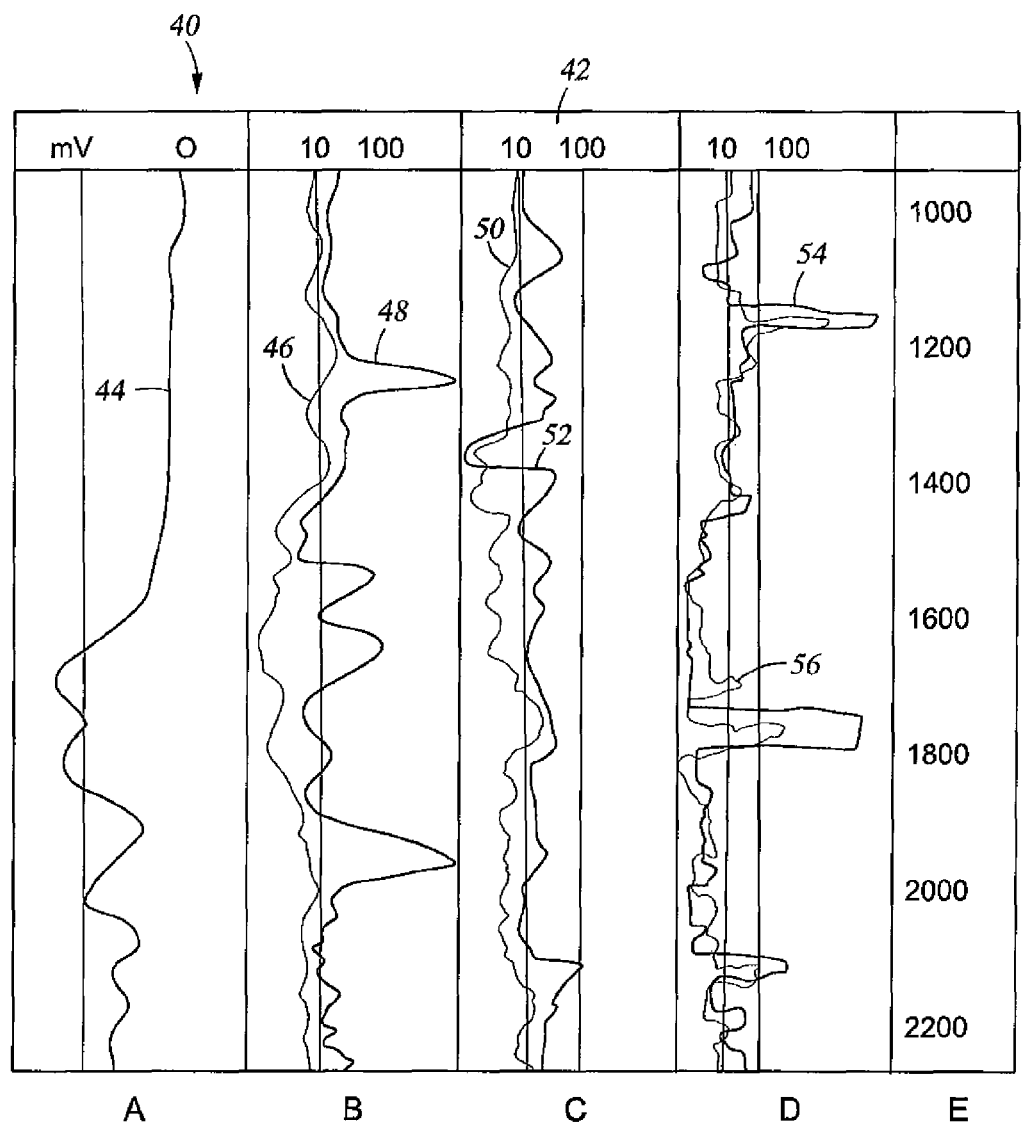
FIG. 2 illustrates log traces of measured downhole data acquired by sensors deployed subsurface.

FIG. 2 shows an exemplary log presentation 40 of the raw downhole measurement data obtained with a logging system such as the one depicted in FIG. 1. The log presentation 40 is typically made substantially entirely from data recorded by the various sensors (e.g., 16, 18, 20, 22 in FIG. 1) and captured by a recording system coupled to the sensor(s) downhole (e.g., electronics/hardware 24 in FIG. 11 and/or by the surface equipment 30 at the wellsite or at a remote location. Logging systems may also be implemented with means for real-time signal/data telemetry wherein measurement data are transmitted uphole for direct processing (e.g., wired drill-pipe systems).

The log data (e.g., voltages, detector counts, etc.) are typically presented on a grid-type scale including a plurality of data tracks, shown as A, B, C and D in FIG. 2. The tracks A, B, C, D include a header 42 which indicates the data type(s) for which the curves 44, 46, 48, 50, 52, 54, 56 are presented in each respective track. A depth track E, which shows the measured depth (or alternative depth measure such as true vertical depth) of the data is also depicted in the log presentation 40. FIG. 2 represents only one example or a data log which is typically produced in the industry and is not intended to limit the scope of the invention. Log presentations routinely follow a standard format prescribed and published by the American Petroleum Institute, Washington D.C.

As previously discussed herein, interpretation algorithms generally depend on the input of one more parameters that affect the quantities or values yielded by the algorithm. Standard interpretation algorithms, and in many cases the design of the sensors themselves, are not adapted to extract an indication of the needed parameter(s). An example of such an input parameter for well logging is the borehole fluid type. The borehole fluid type affects interpretation algorithms which yield the formation density, photoelectric factor (PEF), neutron porosity, resistivity, and many other quantities. The depth at which the borehole fluid type changes from liquid to air, called the fluid level, is also important. The fluid level is useful in isolation and as an aid in determining the pressure exerted on tools in the liquid-filled part of the well.

Well operators have a general idea about the dominant borehole fluid type in a well and assume that the entire borehole is filled with this fluid. However, there are many examples in which an incorrect fluid type was used to interpret well logs. Moreover, the borehole may be filled with different fluid types such as natural mud and air. The interface between the two fluid types can change even in the short time between separate passes of logging tools. To maintain the accuracy of the logs, the fluid type must be manually modified to be consistent with the fluid in the well at a given depth and time, often by halting log acquisition or processing and adjusting the appropriate input parameter. Consistently performing this procedure correctly is difficult in practice.

One aspect of the invention entails determining the borehole fluid type. For purposes of this disclosure, the borehole fluid type is divided into two categories: liquid and gas. Liquid refers to natural, oil-based, or synthetic oil-based borehole fluids with or without any materials added to modify the density, viscosity, or other properties. Gas refers to an absence of liquid. This situation can occur in so-called air-drilled boreholes. It can also occur in boreholes which fall with natural gas or other gases emitted from the formation or injected into the borehole from the surface.

A partial list of the measurement which can be used to determine the borehole fluid type is.

I. Neutron interference in the natural gamma ray measurement. In a conventional toolstring or system used to log hydrocarbon wells, a neutron source and neutron sensors are included to determine the neutron porosity of the formation. A natural gamma ray sensor is also commonly included to measure the natural radioactivity. In a liquid-filled borehole, neutrons emitted by the source into the borehole typically do not travel far from the source. In a gas-filled borehole, on the other hand, neutrons can travel much further. These neturons eventually interact with the formation and can produce gamma rays. If the natural and gamma ray sensor is sufficiently close to the neutron source, these gamma rays can be detected. The neutron-derived gamma rays can be distinguished from the natural gamma rays from the formation by virtue of their higher energy described in Stoller et al., U.S. Patent Publication No. 2006307629). Thus, a natural gamma ray sensor equipped to count the high-energy gamma rays and placed sufficiently close to the neutron source can be used to determine whether the borehole fluid is liquid or gas.

II. Density measurement. A conventional density measurement consists of a source of gamma rays and at least two sensors axially spaced at different distances from the source. The sensors are shielded to minimize the influence of fluid type on the measurement. A residual effect may nevertheless exist in some density tools, especially for low-energy gamma rays observed by the sensor spaced further from the source (the LS sensor). The gamma rays observed by the sensor spaced nearer to the source (the SS sensor) typically show almost no sensitivity to fluid type. Thus, a comparison of quantities derived from the low-energy gamma rays in the SS and LS sensors can be used to inter the fluid type. In one aspect of the invention, the photoelectric factors derived from the two sensors may be used for this purpose.

III. Acoustic measurement. Acoustic sensors are often used in air-drilled boreholes to detect the sound of natural gas escaping from the formation. In a liquid-drilled borehole, these sensors can saturate. Looking for this saturation thus provides an indication of the borehole fluid type as a function of depth.

IV. Mud resistivity. Correctly interpreting formation resistivity measurements often requires that the salinity of the mud be known. For this reason, a mud resistivity sensor may be placed in the toolstring. The character of the mud sensor's output can vary depending on fluid type and may therefore be used as an indicator.

The individual measurements work better or worse in different environments. For example, the density-derived fluid type measurement is not optimal when the tool is in casing. The difficulty is due in part to the presence of the casing, which distorts the transport of low-energy gamma rays, and in part to the loss of contact of the pad with the surface of the casing, which occurs when the backup arm is withdrawn in accordance with standard practice. Another environmental effect which can affect the fluid type indicator is the borehole size. Fluid type measurements based on particle transport up the borehole, such as those derived frosts neutron interface in the natural gamma ray detector or from a density tool, lose contrast in small boreholes.

In one aspect of the invention, each measurement may produce one of three results at each depth level: liquid gas, or "inconclusive." Inconclusive may correspond to a situation in which the relevant sensors are not present in the tool (i.e., the measured data was not obtained with a sensor configured to provide the respective measurement) or the measurement data is obtained under sufficiently adverse environmental conditions that a determination of fluid type cannot be made.

Since the fluid type is not expected to change repeatedly with depth, one aspect may include a filter applied to each measurement to eliminate spurious fluctuations. The filter operating as follows: Within a fixed interval around a given depth, the data values of the measured fluid type are examined. Inconclusive values are ignored. The numbers of liquid and gas data values are counted. If the number of depth samples indicating gas is greater than the number indicating liquid, the borehole fluid type at the given depth is assigned to gas. Otherwise, it is assigned to liquid.

Theoretical considerations, laboratory tests, or field tests can identify which measurements give the most accurate indications of the selected parameter (e.g. fluid type) over the wildest range of environmental conditions. Selection of the single most accurate measurement can be based on the presence or absence of the requisite sensors in the measurement system, quality control indicators derived from within the particular measurement, measurements or parameters reflecting the measured environments, field or laboratory experience, or a combination of any of these. The measurements may thus be arranged hierarchically, with the generally more robust measurements appearing before the less robust measurements. The list presented above is only one example of such a hierarchy.

In one aspect, the selection of the most accurate measurement parameter proceeds according to a hierarchy. At each depth during real-time acquisition or playback, the generally most robust measurement is examined first. If the measurement data can determine the selected parameter under the particular conditions present at this depth, it is automatically output. If the measurement is inconclusive, the next most accurate measurement data is examined. If that measurement can determine the selected, parameter, it is output. Otherwise, the next most accurate measurement is attempted. This process continues until all measurements have been tried, if necessary. If the desired parameter is still inconclusive, one aspect can be implemented wherein the parameter is inferred from other parameter information such as the drilling fluid density entered by the user. The invention thus adapts its answer dynamically to the logging conditions to maximize the accuracy of the result.

In some aspects, the parameter determined at each depth may then be used as input to other interpretation algorithms. Among the algorithms which could use the fluid type parameter are the density and PEF, neutron porosity, and resistivity measurements. Other parameters that can be determined include: borehole diameter—obtained from various mechanical calipers or other known measurements; salinity of the borehole fluid—determined in several ways, among, which are measurements based on a mud resistivity sensor or on neutron detection (described in U.S. Pat. No. 6,648,083); indication of the presence or absence of casing—obtained from measurements like those from resistivity and casing collar locator sensors.

One skilled in the art will appreciate that virtually any measurement data can be placed into the framework of the present invention to produce desired parameter values. Moreover, in the case of well logging, the selected parameter may reflect the information, reservoir and/or the borehole. For example, aspects of the invention can be implemented combining density and PEF measurements and nuclear spectroscopy measurements to automatically determine lithology. This answer may in turn be useful for improving the porosity derived from neutron and density measurements.

Figure 3:
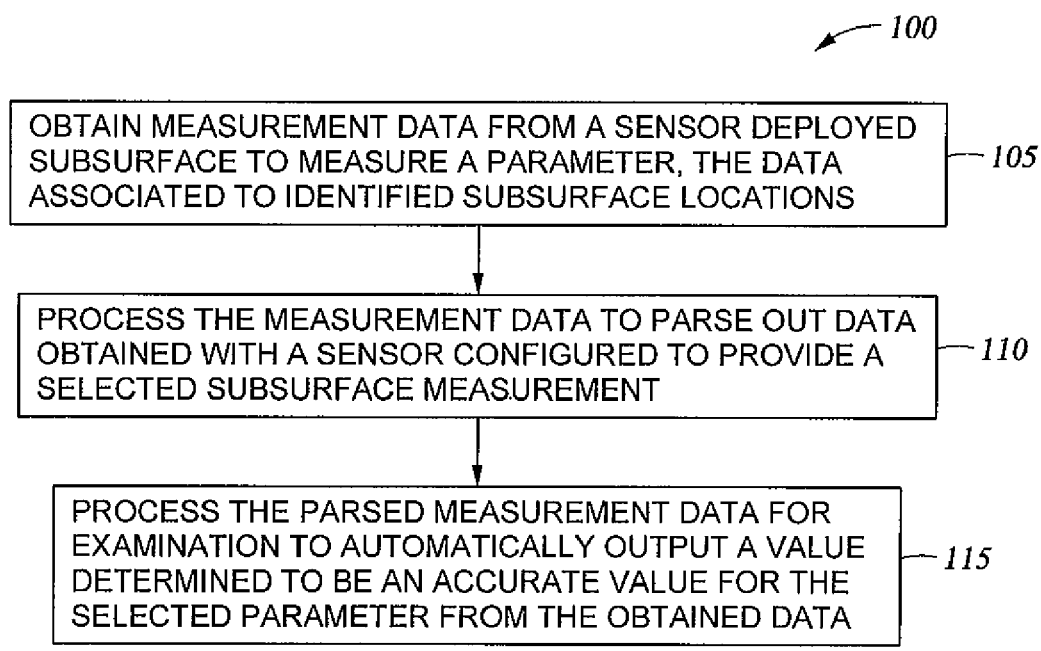
FIG. 3 shows a flow chart of a method for determined of a subsurface parameter in accord with aspects of the invention.

FIG. 3 shows a flow chart of a method 100 for determining a subsurface parameter according to an aspect of the invention. In one aspect, step 105 entails obtaining measurement data from at least one sensor deployed subsurface to measure a parameter at an identified depth or location as described herein. At step 110, the obtained measurement data are processed to parse out the data obtained with one or more sensors configured to provide a measurement of a selected subsurface parameter. As described herein, this can entail parsing out data obtained with all screws which can provide a measurement of the desired parameter. At stop 115, the parsed measurement data is processed for examination to automatically output a value determined to be an accurate value for the selected subsurface parameter from the obtained measurement data. The parsed data is examined in light of the various factors and according to the techniques described herein.

Another aspect of the invention entails determination of the selected parameter from all available measurement data, eliminating inconclusive results, and selecting the parameter that the majority of the remaining measurements indicate. Another aspect can be implemented to perform a weighted average of the data obtained from all the non-inconclusive measurement. In such an aspect the weights can be set to be equal, or they can be based on the environment conditions existing at each depth level so that the measurements judged to be more accurate are given a larger weight. In yet other aspects, the hierarchy of measurements (e.g., those described above) my be adjusted depth-by-dead baaed on environmental conditions.

Aspects of the invention may be implemented by programming one or more suitable general-purpose microprocessors. The programming may be accomplished through the use of one or store program storage devices readable by the processor(s) and encoding one or more programs of instructions executable by the processor(s) for performing the operations disclosed herein. The program storage device may take the form of e.g., one or more floppy disk; a CD ROM or other optical disk; a magnetic tape; a read-only memory chip (ROM); and other forms of the kind well-known in the art or subsequently developed. The program of instructions may he "object code" i.e., in binary form that is executable more-or-less directly by the processor; in "source code" that requires compilation or interpretation before execution; or in some intermediate form such as partially compiled code. The precise forms of the program storage device and of the encoding of instructions are immaterial here. Thus these processing means may be implemented in the surface equipment 30, in the tool 12, at a remote processing center (not shown), or distributed among these as known as the art.

One aspect of the invention entails a computer program processable by one or more processors as described above, including instructions to accept measurement data obtained by sensors deployed subsurface to make the measurements at identified depths as described herein. In some aspects, the program can be loaded into a processor 24 linked to the sensors 16, 18, 20, 22 in the tool as shown in FIG. 1. In such a system, the parameter data can be determined and transmitted update in real-time by conventional telemetry (e.g., via wired drill pipe). In addition to selecting a parameter automatically, another advantage of the invention is that requires only a single pass through the log data permitting turnkey logging operations in which no further processing is required once the sensors are brought to the surface. The computer program instructions further include instructions to process the measurement data to parse out the data obtained with the requisite sensor(s) to provide a measurement of the selected parameter, and instructions to process the parsed data for examination as described herein. For example, the data can be examined in the order of most to least robust to automatically output the first data value of adequate accuracy for the selected parameter. Computer program aspects can also be implemented for efficient processing after the log data have been acquired, using logs acquired at different times and with different tools. Recorded-mode and memory-mode processing are examples of this kind of processing. Optionally, aspects of the invention can include outputting the selected parameter as an input to one or more interpretation algorithms.

The disclosed techniques provide several advantages over conventional processing methods. For instance, the disclosed aspects work independently of the conveyance method. Wireline, slickline, memory logging, production logging, and LWD/MWD methods of conveyance are all possible venues for the application of this invention. Data analysis is expedited since the value of a desired parameter is derived without user invention.

While the present disclosure describes specific aspects of the invention, numerous modifications and variations will become apparent to those skilled in the art after studying the disclosure, including use of equivalent functional and/or a structural substitutes for elements described herein. It will be appreciated by those of ordinary skill in the art that the present invention is applicable to, and can be implemented in, any field where measurement data is obtained and user to glean out useful information. For example, it will be appreciated that it is more and more the practice to combine measurements taken during separate subsurface passes or runs with different investigating devices to produce various measurements of subsurface characteristics or parameters. All such similar variations apparent to those skilled, in the art are deemed to be within the scope of the invention as defined by the appended claims. For the purposes of this specification it will be clearly understood that the word "comprising" means "including but not limited to", and that the word "comprises" has a corresponding meaning.

What is claimed is:

1. A computer-implemented method for determination of a subsurface parameter, comprising:
   obtaining, with a computer, raw measurement data from at least one sensor deployed subsurface, the raw measurement data being associated to identified subsurface locations, and the at least one sensor comprising a first sensor and a second sensor;
   processing, with the computer, the obtained raw measurement data to parse out a measurement of a selected subsurface parameter from the raw measurement data obtained with the at least one sensor; and
   processing, with the computer, the measurement of the selected subsurface parameter obtained from raw measurement data obtained with the at least one sensor for examination to automatically output a value determined to be an accurate value for the selected subsurface parameter by steps comprising:
   processing raw measurement data obtained from the first sensor to parse out a first measurement of a selected subsurface parameter from the raw measurement data obtained with the first sensor, and
   processing raw measurement data obtained from the second sensor to parse out a second measurement of the selected subsurface parameter from the raw measurement data obtained with the second sensor;
   wherein the selected subsurface parameter comprises a borehole fluid type,
   wherein the output comprises a value designated as one of liquid, gas, or inconclusive,
   wherein the a value for the selected subsurface parameter is inferred from other data input by a user in response to a determination that all the raw measurement data have been examined resulting in an inconclusive value,
   wherein the first sensor comprises a natural gamma ray sensor, and
   wherein the second sensor comprises a set of low-energy gamma ray sensors.

2. The method of claim 1, wherein processing the obtained raw measurement data comprises parsing out data obtained with each of the at least one sensor.

3. The method of claim 2, wherein processing the measurement of the selected subsurface parameter comprises selecting more robust measurement data for examination before less robust measurement data and selecting a first data value of adequate accuracy as the output value for the selected subsurface parameter.

4. The method of claim 3, wherein the obtained raw measurement data are processed to output the selected subsurface parameter value while the at least one sensor is deployed subsurface.

5. The method of claim 2, wherein the raw measurement data is processed to automatically output respective values for one or more selected subsurface parameters corresponding to measurement data obtained at various subsurface locations.

6. The method of claim 3, wherein examination of the raw measurement data for an accuracy determination is based on use of a specific sensor type to obtain the raw measurement data, a quality control indicator associated with a measurement, a measurement or parameter reflecting the measured environment, or on field or laboratory derived data.

7. The method of claim 2, wherein processing the obtained raw measurement data comprises eliminating inconclusive data and selecting a parameter value indicated by the majority of remaining data as the accurate value for the selected subsurface parameter.

8. The method of claim 2, wherein processing the measurement of the selected subsurface parameter comprises adjusting an order of examination among more robust measurement data and less robust measurement data based on an environmental condition.

9. The method of claim 2, wherein processing the obtained raw measurement data comprises eliminating inconclusive data and performing a weighted average of remaining data to determine a value for the selected subsurface parameter, and
   wherein weights for performing the weighted average are set equal or based on a subsurface condition such that measurement data determined to be more accurate are given a larger weight.

10. The method of claim 2, further comprising inputting the output parameter value to an interpretation algorithm configured to relate the parameter value to a petrophysical characteristic.

11. The method of claim 1, wherein examination of the raw measurement data for an accuracy determination comprises examining the raw measurement data sequentially, beginning with a most robust measurement first, and outputting a first value determined to be accurate for the selected parameter.

12. The method of claim 1, wherein the other data comprises drilling fluid density.

13. A system for determination of a subsurface parameter, comprising:
   a processor to accept raw measurement data obtained from at least one sensor deployed subsurface, the raw measurement data being associated to identified subsurface locations, and the at least one sensor comprising a first sensor; and
   the processor configured with instructions to process the obtained raw measurement data to parse out a measurement of a selected subsurface parameter from the raw measurement data obtained with the at least one sensor;
   wherein the processor instructions include processing the measurement of the selected subsurface parameter obtained from raw measurement data obtained with the at least one sensor for examination to automatically output a value determined to be an accurate value for the selected subsurface parameter, by steps comprising:
   processing raw measurement data obtained from the first sensor to parse out a first measurement of a selected subsurface parameter from the raw measurement data obtained with the first sensor,
   wherein the selected subsurface parameter comprises a borehole fluid type,
   wherein the output comprises a value designated as one of liquid, gas, or inconclusive,
   wherein the a value for the selected subsurface parameter is inferred from other data in response to a determination that all the raw measurement data have been examined resulting in an inconclusive value,
   wherein, for a given depth range, a number of liquid designations are compared to a number of gas designations,
   wherein the output is selected to be a liquid if the number of liquid designations exceeds the number of gas designations, and is otherwise selected to be a gas, and
   wherein the first sensor comprises a natural gamma ray.

14. The system of claim 13, wherein the processor instructions for processing the obtained raw measurement data include parsing out data obtained with each of the at least one sensor, and wherein the processor instructions for processing the measurement of the selected subsurface parameter include selecting more robust measurement data for examination before less robust measurement data and selecting a first data value of adequate accuracy as the output value for the selected subsurface parameter.

15. The system of claim 13, wherein the at least one sensor further comprises a second sensor comprising a set of low-energy gamma ray sensors, and
   wherein the processor instructions further comprise the step of processing raw measurement data obtained from the second sensor to parse out a second measurement of the selected subsurface parameter from the raw measurement data obtained with the second sensor.

16. A computer program stored in a non-transitory computer readable medium containing computer instructions stored therein for causing a programmable computer to perform steps processable by a processor, comprising:
   accepting raw measurement data obtained from at least one sensor deployed subsurface, the raw measurement data being associated to identified subsurface locations, and the at least one sensor comprising a first sensor and a second sensor;
   processing the obtained raw measurement data to parse out a measurement of a selected subsurface parameter from the raw measurement data obtained with the at least one sensor; and
   processing the measurement of the selected subsurface parameter obtained from raw measurement data obtained with the at least one sensor for examination to automatically output a value determined to be an accurate value for the selected subsurface parameter by steps comprising:
      processing raw measurement data obtained from the first sensor to parse out a first measurement of a selected subsurface parameter from the raw measurement data obtained with the first sensor, and
      processing raw measurement data obtained from the second sensor to parse out a second measurement of the selected subsurface parameter from the raw measurement data obtained with the second sensor;
   wherein the output comprises a value designated as one of liquid, gas, or inconclusive,
   wherein the a value for the selected subsurface parameter is inferred from other data in response to a determination that all the raw measurement data have been examined resulting in an inconclusive value,
   wherein a weighted average is computed from liquid and gas designations, the weighted average being weighted based on an accuracy of the raw measurement data,
   wherein the weighted average is reported,
   wherein the first sensor comprises a natural gamma ray sensor, and
   wherein the second sensor comprises a set of low-energy gamma ray sensors.

17. The computer program of claim 16, wherein the selected subsurface parameter comprises a borehole fluid type.

18. The computer program of claim 17, wherein the output comprises a value designated as one of liquid, gas, or inconclusive.

* * * * *